(12) United States Patent
Fujiwara et al.

(10) Patent No.: US 8,814,228 B2
(45) Date of Patent: Aug. 26, 2014

(54) LOCKING PART STRUCTURE FOR VEHICLE

(75) Inventors: Makoto Fujiwara, Wako (JP); Fumio Furuki, Wako (JP); Takeki Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1040 days.

(21) Appl. No.: 12/488,866

(22) Filed: Jun. 22, 2009

(65) Prior Publication Data

US 2009/0314041 A1 Dec. 24, 2009

(30) Foreign Application Priority Data

Jun. 23, 2008 (JP) ................................. 2008-163054

(51) Int. Cl.
*E05C 3/06* (2006.01)
*E05B 65/12* (2006.01)
*B60J 5/04* (2006.01)

(52) U.S. Cl.
CPC ............... *E05B 83/16* (2013.01); *B60J 5/0433* (2013.01); *E05B 79/04* (2013.01); *E05B 77/10* (2013.01); *Y10S 292/23* (2013.01)
USPC .................................... 292/216; 292/DIG. 23

(58) Field of Classification Search
CPC .............. B06J 5/107; B06J 5/10; B06J 5/101; E05B 77/10; E05B 79/04; E05B 83/16; E05B 77/04
USPC ............... 292/201, 340, 341, 341.12, 341.13, 292/DIG. 43, DIG. 53, DIG. 54, DIG. 56, 292/DIG. 57, DIG. 64

See application file for complete search history.

(56) References Cited

U.S. PATENT DOCUMENTS

| | | | | |
|---|---|---|---|---|
| 6,042,160 | A * | 3/2000 | Hamada et al. ................ | 292/216 |
| 6,474,721 | B2 * | 11/2002 | Nishikawa et al. ......... | 296/146.6 |
| 6,776,449 | B2 * | 8/2004 | Komatsu et al. ............ | 296/146.5 |
| 6,886,874 | B2 * | 5/2005 | Abe .............................. | 296/1.08 |
| 6,929,308 | B2 * | 8/2005 | Komatsu et al. ............ | 296/146.5 |
| 7,537,267 | B2 * | 5/2009 | Tanaka et al. ............... | 296/146.6 |
| 8,066,314 | B2 * | 11/2011 | Tamura et al. .............. | 296/26.09 |

FOREIGN PATENT DOCUMENTS

JP 2006-298329 11/2006

* cited by examiner

*Primary Examiner* — Kristina Fulton
*Assistant Examiner* — Christine M Mills
(74) *Attorney, Agent, or Firm* — Rankin, Hill & Clark LLP

(57) ABSTRACT

A locking part structure for a vehicle, which includes a door, locking means for locking the door to a vehicle body when the door is closed, and an auxiliary plate that connects the door to the locking means. The locking means comprises a door side locking part that is set in a lock opening formed in the door, and a vehicle body side locking part that is disposed on a vehicle body side and engages with the door side locking part when the door is closed. The auxiliary plate comprises a door fixing part to be fixed to the door, a lock fixing part to be fixed to the door side locking part, and a bending part that is disposed between the door fixing part and the lock fixing part, and formed in a bending form so as to be stretchable.

8 Claims, 5 Drawing Sheets

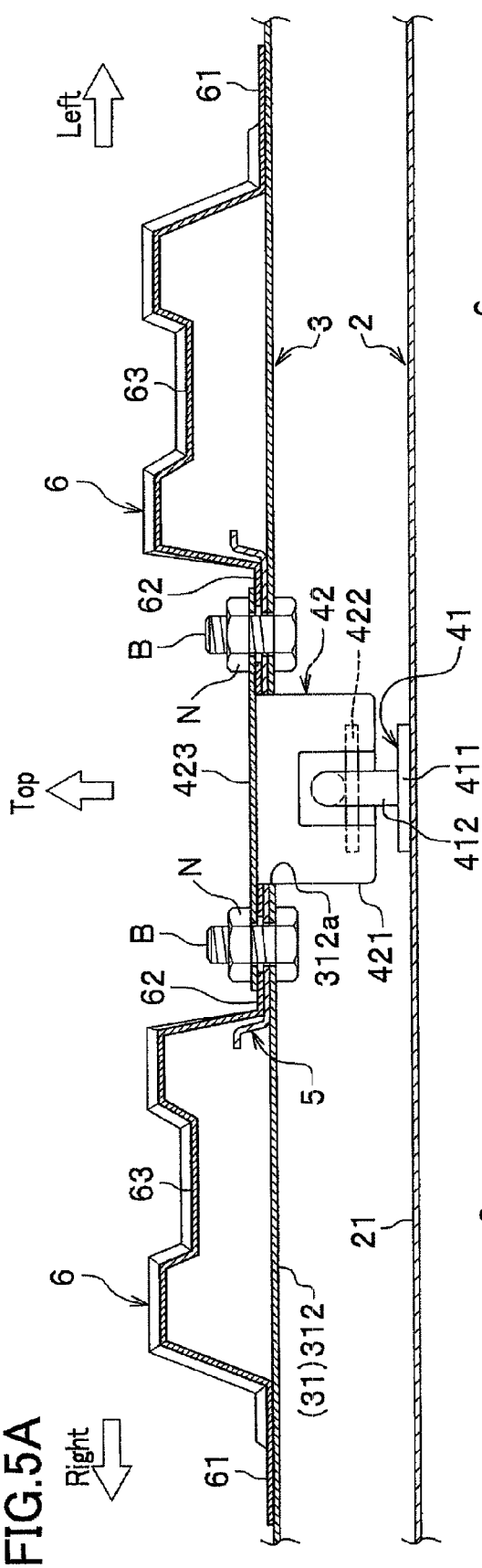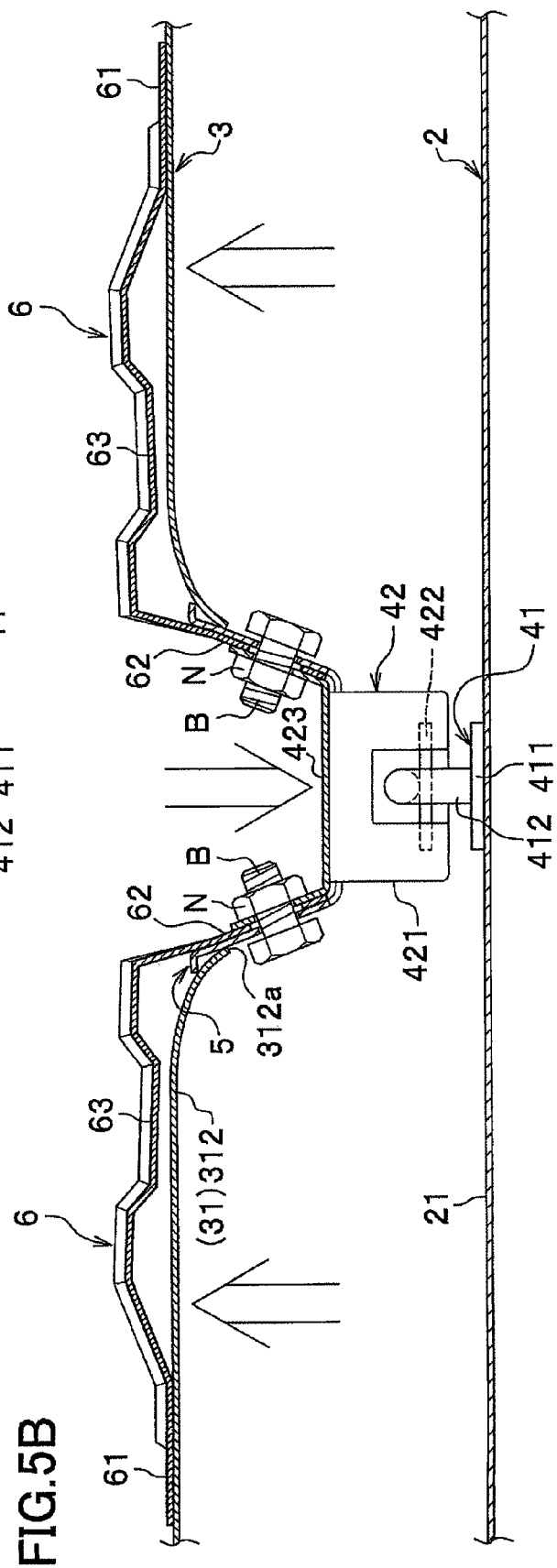

LOCKING PART STRUCTURE FOR VEHICLE

CROSS REFERENCES TO RELATED APPLICATIONS

This application claims the foreign priority benefit under Title 35, United States Code, §119 (a)-(d), of Japanese Patent Application No. 2008-163054 filed on Jun. 23, 2008 in the Japan Patent Office, the disclosure of which is herein incorporated by reference in its entirety.

BACKGROUND OF THE INVENTION

1. Field of the Invention

The present invention relates to a locking part structure for a vehicle which locks a door to a vehicle body.

2. Description of the Related Art

In a patent document 1 (Japanese Laid-Open Patent Publication No. 2006-298329, paragraphs 0016 to 0021, FIG. 2, FIG. 3), a back door structure having a door side locking part on an inner panel of a back door is disclosed. In the back door structure, a stiffener, which stiffens a part around a fixing hole (lock opening) of a fixing part of the door side locking part on the inner panel, is disposed bridging between the inner panel and the outer panel.

In the back door structure described above, the rigidity of the fixing part to which the door side locking part is fixed is improved in comparison with a structure in which the stiffener is provided only on an inner panel. Accordingly, the door side locking part is prevented from separating from the inner panel of the back door at a rear-end collision of the vehicle.

However, even if the back door structure disclosed in the patent document 1 is adopted, there is a possibility that the door side locking part is separated from the inner panel when the impact is too large. Accordingly, a structure that can surely prevent a door from opening has been expected.

It is therefore an object of the present invention to overcome the above-mentioned drawback by providing a locking part structure for a vehicle that can prevent a door from opening even if a door side locking part is pulled out from a lock opening provided in the door.

SUMMARY OF THE INVENTION

The present invention provides a locking part structure for a vehicle, which includes a door, locking means for locking the door to a vehicle body when the door is closed, and an auxiliary plate that connects the door to the locking means. The locking means comprises a door side locking part that is set in a lock opening formed in the door, and a vehicle body side locking part that is disposed on a vehicle body side and engages with the door side locking part when the door is closed. The auxiliary plate comprises a door fixing part to be fixed to the door, a lock fixing part to be fixed to the door side locking part, and a bending part that is disposed between the door fixing part and the lock fixing part and formed in a bending form so as to be stretchable.

According to the locking part structure for a vehicle, when the door is separated from the door side locking part due to, for example, the impact at the time of collision, the bending part of the auxiliary plate, which is formed in a bending form so as to be stretchable, stretches. Accordingly, the connection between the door and the door side locking part can be maintained by the auxiliary plates, and the door is prevented from opening.

In addition, it is only necessary to consider a load applied to the auxiliary plate in the stretching direction. Accordingly, the auxiliary plate can be prevented from increasing in thickness.

Furthermore, the locking part structure absorbs collision energy when the bending part of the auxiliary plate stretches. Accordingly, the connection between the door and the door side locking part can be maintained even if the impact is substantially large.

It is preferable that the door side locking part is fixed to the lock fixing part from the inner side of the door.

According to the locking part structure described above, since the lock fixing part is pressed by the door side locking part from the inner side of the door when the door side locking part is separated from the door, a force to pull out the auxiliary plate from the lock opening works. Accordingly, the bending part can be surely stretched while maintaining the connection between the door and the locking means using the auxiliary plates.

It is preferable that a stiffener is fit on a part around the lock opening and the lock fixing part is fixed to the door through the stiffener.

According to the locking part structure described above, the rigidity of the part around the lock opening is improved. Accordingly, the fixing strength of the lock fixing part is increased., and the door side locking part can be prevented from being pulled out from the lock opening.

It is preferable that the auxiliary plate has a step formed thereon which extends between the door fixing part and the lock fixing part for stiffening the bending part.

According to the locking part structure described above, the bending part is stiffened by the step extending between the door fixing part and the lock fixing part. Accordingly, a load to stretch the auxiliary plate can be increased, and the door side locking part can be surely prevented from being separated from the door. In addition, the auxiliary plate can absorb more collision energy when the door side locking part is separated from the door.

According to the present invention, it becomes possible to provide a locking part structure for a vehicle that can prevent a door from opening even when the door side locking part is separated from the lock opening of the door.

BRIEF DESCRIPTION OF THE DRAWINGS

FIG. 5A and FIG. 5B show cross sectional views to explain operations of a locking part structure according to the embodiment, and FIG. 5A shows a state before collision, while FIG. 5B shows a state after collision.

DESCRIPTION OF THE PREFERRED EMBODIMENTS

Figure 1:
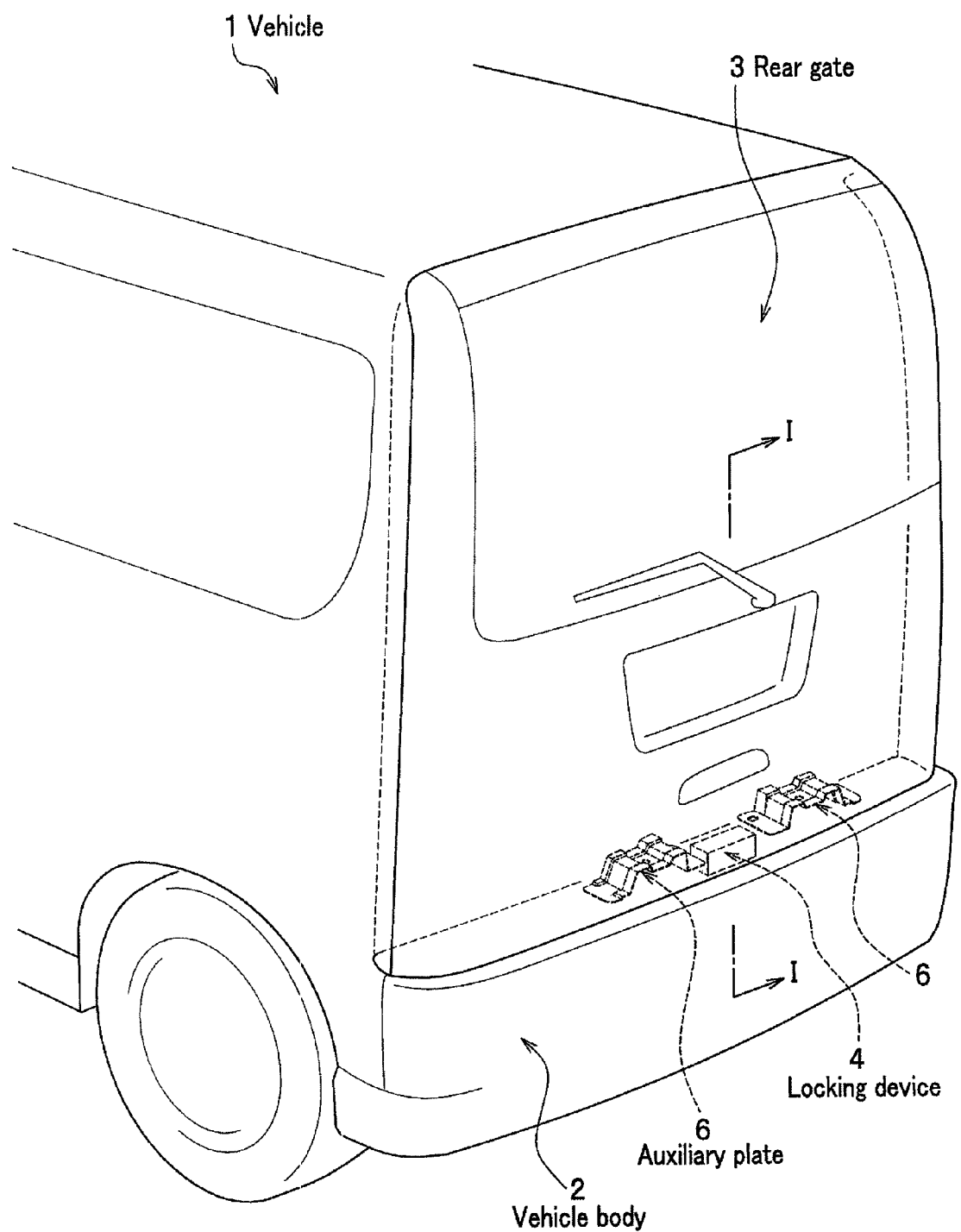
FIG. 1 shows a perspective view of a vehicle provided with a locking part structure according to an embodiment of the present invention, which is seen from the diagonal upper rear direction of the vehicle.

The best mode for carrying out the present invention will be explained by referring to drawings. In the explanation, the same reference numerals are appended to the same components, and a duplicate explanation will be omitted. In the following explanation, directions of the front, rear, left, right, top, and bottom are set identical to those of a vehicle.

FIG. 1 shows a perspective view of a vehicle 1 provided with a locking part structure according to the embodiment, which is seen from the diagonal upper rear direction of the vehicle 1.

As shown in FIG. 1, the vehicle 1 has a rear gate 3 that is a door to open and close the rear side of a vehicle body 2. The rear gate 3 is a hatchback type, and pivotably fixed to an upper part of the vehicle body 2. On the lower end part of the rear gate 3, a locking device 4, that is locking means which locks the rear gate 3 to the vehicle body 2 when the rear gate 3 is closed, is disposed. Inside the rear gate 3, a stiffener 5 (refer to FIG. 2) and auxiliary plates 6, 6 are disposed.

In FIG. 1, the locking device 4 and auxiliary plates 6, 6 are drawn with dotted lines, and the stiffener 5 is omitted.

Figure 2:
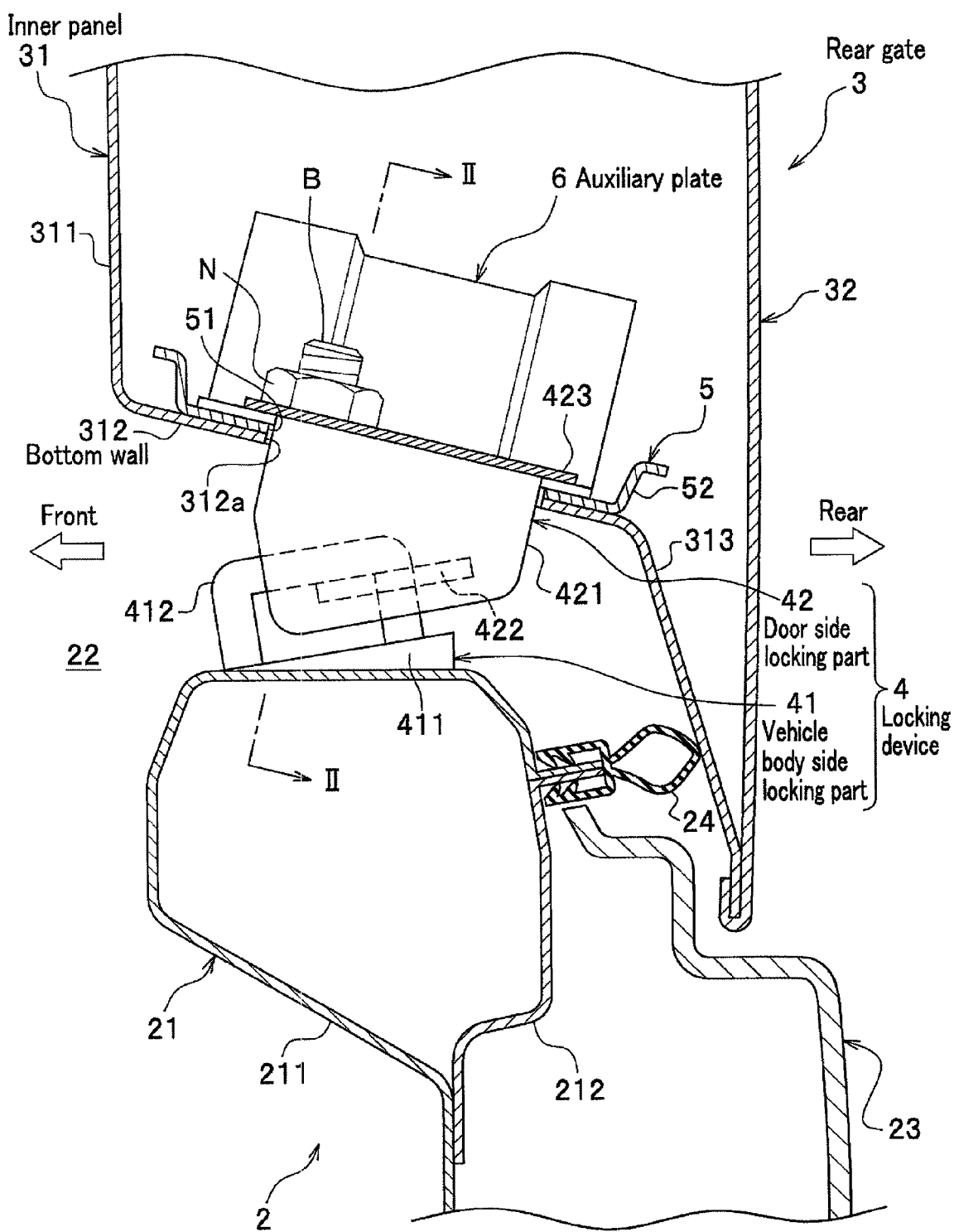
FIG. 2 shows a cross sectional view of the vehicle shown in FIG. 1 taken along I-I line.

FIG. 2 shows a cross sectional view of the vehicle 1 shown in FIG. 1 taken along I-I line.

As shown in FIG. 2, on the rear part of the vehicle body 2, a rear end panel 21 extending in the right-left direction is disposed to form the rear end part of a cargo room 22. The rear end panel 21 is formed in a hollow structure by a first panel 211 and a second panel 212. The first panel 211 is a curved panel, and the second panel 212 blocks an opening of the first panel 211. At the rear side of the rear end panel 21, a weather strip 24 to be in contact with the rear gate 3 and a rear bumper 23 are disposed. An upper end of the rear bumper 23 is arranged at the lower side of the weather strip 24.

The rear gate 3 is formed in a hollow structure by combination of an inner panel 31 and an outer panel 32. The inner panel 31 and outer panel 32 are formed by press forming of steel. The inner panel 31 includes a main body 311 extending in the top-bottom direction, a bottom wall 312 extending rearward from the lower end part of the main body 311, and an extension part 313 extending downward from the rear end part of the bottom wall 312. The bottom wall 312 is provided with a lock opening 312a that is a through-hole in the top-bottom direction. For example, the lock opening 312a has a rectangular shape in plan view. The bottom wall 312 is also provided with bolt-holes 314, 314 at both right and left sides of the lock opening 312a (refer to FIG. 3A). Bolts B, B to fasten a door side locking part 42, which will be described later, to the rear gate 3 are inserted into the bolt-holes 314.

The outer panel 32 is disposed at a distance from the main body 311 of the inner panel 31, and extends in the top-bottom direction. The lower end part of the outer panel 32 is fixed to the lower end part of the extension part 313.

The locking device 4 consists of a vehicle body side locking part 41, which is fixed to the vehicle body 2, and a door side locking part 42 which is fixed to the rear gate 3.

The vehicle body side locking part 41 has a base 411, which is fixed to the upper part of the rear end panel 21, and an engagement part 412 which is implanted to the upper part of the base 411. The engagement part 412 is formed in substantially a "U" shape in side view.

The door side locking part 42 is a member that engages with the vehicle body side locking part 41 when the rear gate 3 is closed. The door side locking part 42 is disposed inserted into the lock opening 312a of the rear gate 3. In a case 421, the door side locking part 42 has a latch 422 to be engaged with the engagement part 412. The latch 422, although not shown, can be opened and closed in conjunction with an operation of an operation unit disposed on the rear surface of the rear gate 3.

On the upper part of the case 421, a retainer 423 is disposed. The retainer 423 is retained on a periphery of the lock opening 312a from the upper side. The case 421 is, for example, integrally formed with the retainer 423. The retainer 423 is provided with bolt-holes 423a, 423a at both right and left sides thereof (refer to FIG. 3B), which are through-holes into which the bolts B, B are inserted. On the bolt-holes 423a, 423a, nuts N, N are disposed and fixed by, for example, welding. The door side locking part 42 is fastened to the rear gate 3 by screwing the bolts B, B that are inserted into the bolt-holes 423a, 423a into the nuts N, N.

Figure 3A:
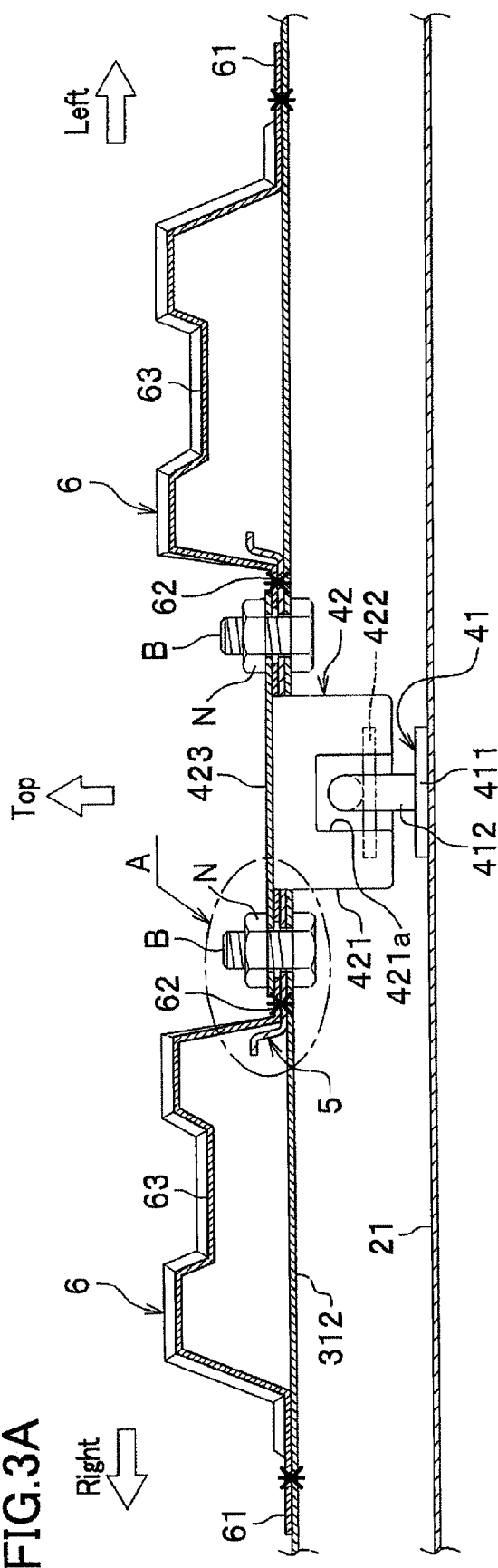
FIG. 3A shows a cross sectional view of the locking part structure shown in FIG. 2 taken along II-II line.

The front and lower surfaces of the case 421 are provided with a slit 421a for inserting the engagement part 412 therein (refer to FIG. 3A).

Figure 3B:
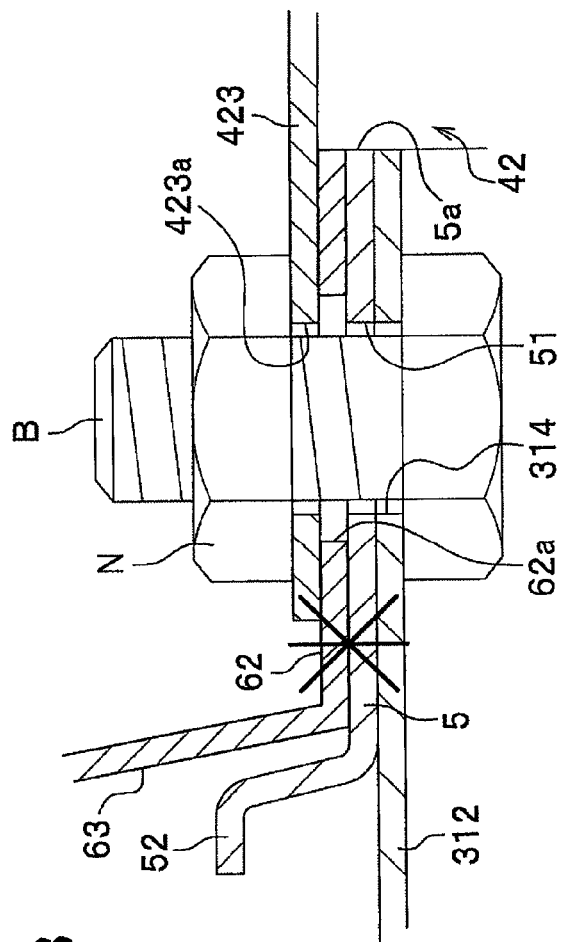
FIG. 3B shows an enlarged view of "A" part shown in FIG. 3A.

FIG. 3A shows a cross sectional view of the locking part structure shown in FIG. 2 taken along II-II line, and FIG. 3B shows an enlarged view of "A" part shown in FIG. 3A.

As shown in FIG. 3A, the stiffener 5 and auxiliary plates 6, 6 are disposed on the bottom wall 312 of the inner panel 31 as well as the door side locking part 42.

As shown in FIG. 2, FIG. 3A and FIG. 3B, the stiffener 5 is a member that stiffens a part around the lock opening 312a of the inner panel 31. For example, the stiffener 5 is a plate member made of steel, and provided with a through-hole 5a at the center thereof whose shape corresponds to the shape of the lock opening 312a. At each of the right and left sides of the through-hole 5a, bolt-holes 51, 51 into which the bolts B, B are inserted are formed. In addition, a flange 52 is formed by bending a periphery of the stiffener 5.

As shown in FIG. 3A, the auxiliary plates 6, 6 are members that connect the bottom wall 312 of the rear gate 3 and the door side locking part 42 of the locking device 4, and disposed at each of the right and left sides of the door side locking part 42. The auxiliary plate 6 is formed, for example, by bending a single steel plate by press forming and the like.

The auxiliary plate 6 includes a door fixing part 61 to be fixed to the bottom wall 312, a lock fixing part 62 to be fixed to the door side locking part 42, and a bending part 63 which is formed in a bending form so as to be stretchable in the right-left direction between the door fixing part 61 and the lock fixing part 62.

The door fixing part 61 is disposed on the upper surface of the bottom wall 312, and welded at a position distant from the door side locking part 42 in the right-left direction.

As shown in FIG. 3B, the lock fixing part 62 is disposed between the retainer 423 of the door side locking part 42 and the stiffener 5. The lock fixing part 62 is provided with a through-hole 62a into which the bolt B is inserted. The lock fixing part 62 is fixed to the retainer 423 of the door side locking part 42 by the bolt B inserted into the through-hole 62a. Furthermore, the lock fixing part 62 is welded to the bottom wall 312 through the stiffener 5.

In FIG. 3A and FIG. 3B, marks "*" represent points to carry out resistance welding for the auxiliary plates 6, 6. A method for fixing the lock fixing part 62 to the door side locking part 42 is not limited to the one which uses the bolt B, but, the lock fixing part 62 and the door side locking part 42 may be welded, for instance.

Figure 4:
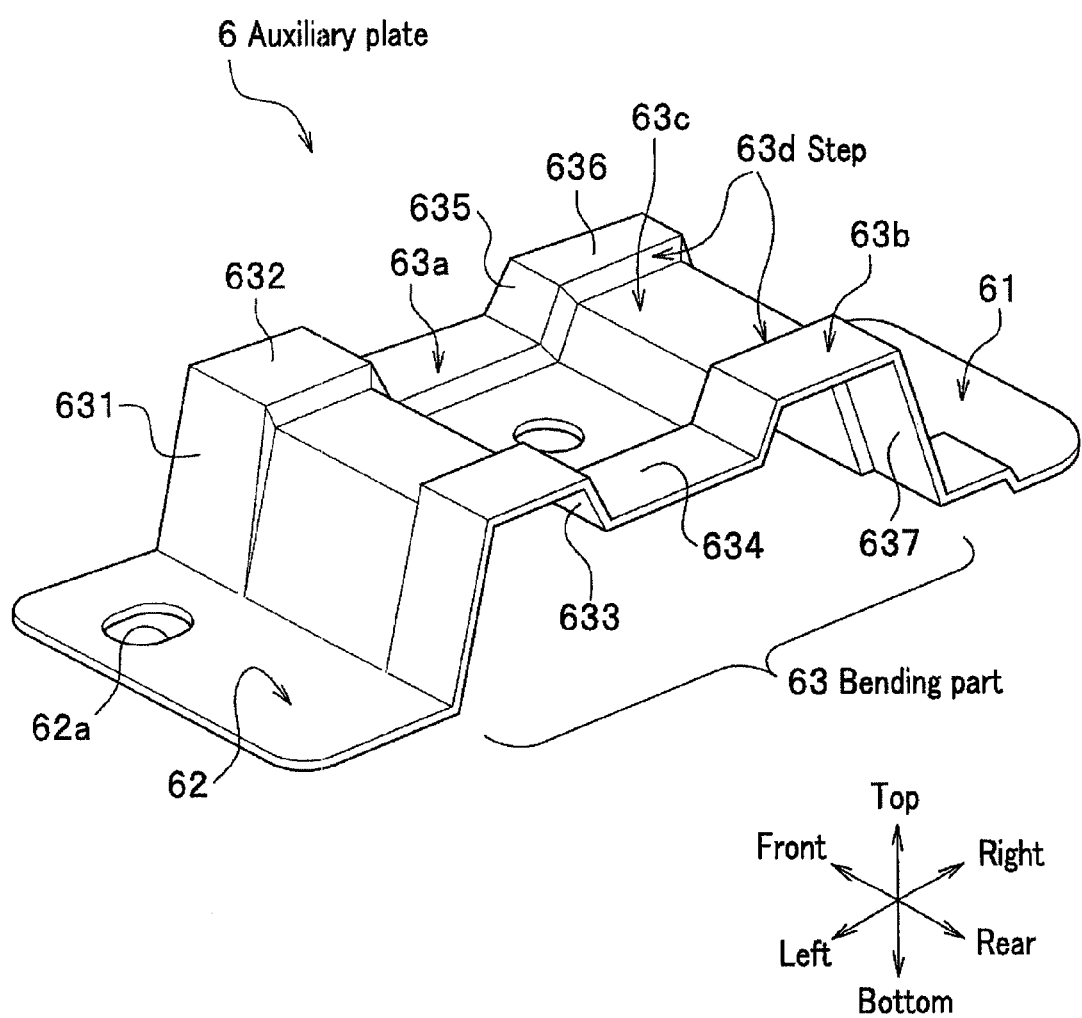
FIG. 4 shows a perspective view of an auxiliary plate.

Next, the bending part 63 of the auxiliary plate 6, which is disposed on the right side of the door side locking part 42, will be explained by referring to FIG. 4. FIG. 4 shows a perspective view of the auxiliary plate 6.

As shown in FIG. 4, the bending part 63 has a first bending part 631, a second bending part 632, a third bending part 633, a fourth bending part 634, a fifth bending part 635, a sixth bending part 636, and a seventh bending part 637. The first bending part 631 is bent upward at the right end of the lock fixing part 62 and extends in the oblique upward direction. The second bending part 632 is bent rightward at the upper end of the first bending part 631 and extends horizontally. The third bending part 633 is bent downward at the right end of the second bending part 632 and extends in the oblique downward direction. The fourth bending part 634 is bent rightward at the lower end of the third bending part 633 and extends horizontally. The fifth bending part 635 is bent upward at the right end of the fourth bending part 634 and extends in the oblique upward direction. The sixth bending part 636 is bent rightward at the upper end of the fifth bending part 635 and extends horizontally. The seventh bending part 637 is bent downward at the right end of the sixth bending part 636 and extends in the oblique downward direction. The lower end of the seventh bending part 637 is continued to the left end of the door fixing part 61.

A height of the first bending part 631 is substantially equal to that of the seventh bending part 637. A height of the third bending part 633 is substantially equal to that of the fifth bending part 635. The heights of the third bending part 633 and fifth bending part 635 are approximately one third of the height of the first bending part 631 and seventh bending part 637.

Accordingly, the bending part 63 is substantially formed in a "M" shape in side view, and stretchable in the right-left direction.

As shown in FIG. 4, the bending part 63 has a front edge part 63a, a rear edge part 63b, and a center part 63c. The front edge part 63a and the rear edge part 63b are formed higher than the center part 63c. Accordingly, from the door fixing part 61 to the lock fixing part 62, steps 63d, 63d are formed between the front edge part 63a and the center part 63c and between the rear edge part 63b and the center part 63c. The steps 63d, 63d improve the rigidity of the bending part 63.

Since the structure of the auxiliary plate 6 disposed on the left side of the door side locking part 42 is similar to that of the auxiliary plate 6 disposed on the right side of the door side locking part 42 except that the right and left are reversed, the detailed explanation thereof will be omitted.

Next, an operation of a locking part structure for a vehicle according to the embodiment will be explained by referring to FIG. 5A and FIG. 5B. FIG. 5A and FIG. 5B show cross sectional views for explaining the operation of the locking part structure according to the embodiment, and FIG. 5A shows a state before collision, while FIG. 5B shows a state after collision.

For example, when the vehicle 1 having the locking part structure shown in FIG. 5A is hit by another vehicle from behind, a force to pivot the rear gate 3 upward may be applied thereto in some cases.

If the force is larger than the strength of the periphery around the lock opening 312a or the fastening strength of the bolts B, B, for example, as shown in FIG. 5B, the periphery around the lock opening 312a is deformed to be widened, or the anchor portions of the bolts B, B and the bolt-holes 314, 314 are damaged. As a result, the door side locking part 42 may be separated and pulled out from the lock opening 312a of the inner panel 31 in some cases. Therefore, the rear gate 3 moves upward away from the vehicle body 2, and a small gap between the rear gate 3 and the vehicle body 2 may be formed.

In this case, the lock fixing parts 62, 62 of the auxiliary plates 6, 6 are fixed (clamped) to the retainer 423 of the door side locking part 42 by the bolts B, B, and are pressed by the retainer 423 of the door side locking part 42 from the inner side of the rear gate 3 (from above). Accordingly, when the rear gate 3 moves upward away from the vehicle body 2, the lock fixing parts 62, 62 are pulled out from the lock opening 312a together with the door side locking part 42.

As a result, a distance between the door fixing part 61 fixed to the bottom wall 312 of the inner panel 31 and the lock fixing part 62 fixed to the door side locking part 42 becomes large, and thereby the bending part 63 stretches.

In this way, the connection between the inner panel 31 and the door side locking part 42 can be maintained by the stretched auxiliary plates 6, 6 (bending parts 63, 63). As a result, the rear gate 3 is prevented from opening, thereby the passenger is prevented from being thrown out from the rear side of the vehicle 1.

Furthermore, a tensile load mainly acts on the auxiliary plate 6. So, it is only necessary to consider only a load to be applied to the auxiliary plate 6 in the stretching direction. Accordingly, the auxiliary plate 6 can be prevented from increasing in thickness.

Moreover, some part of collision energy may be absorbed due to the stretching of the bending part 63.

In the embodiment, since the part around the lock opening 312a is stiffened by the stiffener 5, the door side locking part 42 is hardly separated and pulled out from the lock opening 312a. Accordingly, the locking part structure according to the embodiment can bear a larger collision load in comparison with a locking part structure having no stiffener 5.

In the embodiment, since the steps 63d, 63d are formed in the stretching direction of the bending part 63, the rigidity of the bending part 63 is improved. Accordingly, the bending part 63 can absorb more collision energy, thereby the rear gate 3 can be further prevented from opening.

Preferred embodiments of the present invention have been described by referring to the drawings. However, the present invention is not limited to the embodiments described above, and various modifications, alternatives, or equivalents can be embodied without departing from the scope and spirit of the present invention.

For example, in the embodiment, a locking part structure for a vehicle according to the present invention is applied to the rear gate 3 that opens and closes the rear side of the vehicle 1. However, the locking part structure for a vehicle according to the present invention may be applied to, for example, a door disposed on the side of the vehicle 1 for passengers.

In addition, in the embodiment, a part around the lock opening 312a is stiffened by the stiffener 5. However, the stiffener 5 is used in consideration of the strength of the part around the lock opening 312a, and may be eliminated in some cases depending on the strength.

Similarly, the steps 63d, 63d is formed as needed, and the size of the steps 63d, 63d may be changed depending on the desired rigidity and strength.

According to the embodiment, in the auxiliary plate 6, the door fixing part 61 is fixed to the bottom wall 312 of the inner panel 31 and the lock fixing part 62 is fixed to the door side locking part 42, thereby the bending part 63 stretches in the right-left direction. However, the present invention is not limited to this. For example, the auxiliary plate 6 may be arranged such that the stretching direction of the bending part 63 is in the top-bottom direction.

Although specifically not shown, the bending part 63 stretches in the top-bottom direction if the auxiliary plates 6, 6, which are arranged to sandwich the door side locking part 42, are connected such that the door fixing part 61 of one auxiliary plate 6 is fixed to the main body 311 (refer to FIG. 2) of the inner panel 31 while the lock fixing part 62 is fixed to the door side locking part 42, and the door fixing part 61 of the other auxiliary plate 6 is fixed to the outer panel 32 (refer to FIG. 2) while the lock fixing part 62 is fixed to the door side locking part 42. When the auxiliary plates 6, 6 are connected as described above, the inserting direction into the lock opening 312a becomes identical to the stretching direction of the bending part 63. Accordingly, the bending part 63 can smoothly stretch when the door side locking part 42 is separated from the inner panel 31.

A number of the auxiliary plate 6 is not specifically limited, and it may be one or more than one. It is desirable that the auxiliary plate 6 be symmetrically arranged sandwiching the door side locking part 42 therebetween.

Furthermore, the auxiliary plate 6 may be integrated with the stiffener 5 to form a single component, thereby the number of components and number of assembling processes can be reduced.

What is claimed is:

1. A locking part structure for a vehicle, comprising:
    a door having a bottom wall defining a lock opening;
    a locking device configured to lock the door to a vehicle body when the door is closed; and
    an auxiliary plate that connects the door to the locking device,
    wherein the locking means comprises a door side locking part that is set in the lock opening formed in the door bottom wall, and a vehicle body side locking part that is disposed on a vehicle body side and engages with the door side locking part when the door is closed; and
    wherein the auxiliary plate comprises a first end providing a door fixing part to be fixed to the bottom wall of the door, a second, opposite end providing a lock fixing part that is directly engaged with the door side locking part and the bottom wall of the door, and a bending part, intermediate the first and second ends so as to be disposed between the door fixing part and the lock fixing part, said bending part being spaced from the bottom wall of the door and being formed in a bending form so as to be stretchable to permit said auxiliary plate to stretch and thereby allow said locking device to remain engaged when said vehicle is hit by another vehicle from behind.

2. The locking part structure for a vehicle according to claim 1,
    wherein the door side locking part is fixed to the lock fixing part from an inner side of the door.

3. The locking part structure for a vehicle according to claim 1,
    wherein a stiffener is fit on a part around the lock opening; and
    wherein the lock fixing part is fixed to the door through the stiffener.

4. The locking part structure for a vehicle according to claim 2,
    wherein a stiffener is fit on a part around the lock opening; and
    wherein the lock fixing part is fixed to the door through the stiffener.

5. The locking part structure for a vehicle according to claim 1,
    wherein the auxiliary plate has a step extending between the door fixing part and the lock fixing part for stiffening the bending part.

6. The locking structure for a vehicle according to claim 2,
    wherein the auxiliary plate has a step extending between the door fixing part and the lock fixing part for stiffening the bending part.

7. The locking part structure for a vehicle according to claim 3,
    wherein the auxiliary plate has a step extending between the door fixing part and the lock fixing part for stiffening the bending part.

8. The locking part structure for a vehicle according to claim 4,
    wherein the auxiliary plate has a step extending between the door fixing part and the lock fixing part for stiffening the bending part.

* * * * *